United States Patent

Harms

[15] 3,638,219

[45] Jan. 25, 1972

[54] PCM CODER

[72] Inventor: David A. Harms, Glen Ellyn, Ill.

[73] Assignee: Bell Telephone Laboratories, Incorporated, Murray Hill, Berkeley Heights, N.J.

[22] Filed: May 23, 1969

[21] Appl. No.: 827,261

[52] U.S. Cl. .......................................340/347 AD, 325/38.1

[51] Int. Cl. .......................................................H03k 13/22

[58] Field of Search .................................340/347; 325/38.1

[56] References Cited

UNITED STATES PATENTS 3,091,664 5/1963 Tyrlick ................................325/38.1

3,414,818 12/1968 Reidel...................................340/347

3,462,686 8/1969 Shutterby ............................325/38.1

*Primary Examiner*—Maynard R. Wilbur

*Assistant Examiner*—Jeremiah Glassman

*Attorney*—R. J. Guenther and James Warren Falk

[57] ABSTRACT

A delta modulator converts an analog signal into a PCM code and also provides a corresponding delta modulated signal. The modulator includes a bidirectional counter in its feedback path which counter stores a code corresponding to the sequence of sampled delta modulated signals. The stored code is converted into an analog feedback signal and a PCM code is derived from the counter outputs.

4 Claims, 2 Drawing Figures

PATENTED JAN 25 1972

3,638,219

INVENTOR
D. A. HARMS
BY J S Aubert
ATTORNEY

PCM CODER

BACKGROUND OF THE INVENTION

My invention is related to signal transmission and more particularly to transmission systems utilizing pulse code modulation.

Speech, video and other complex signals are often sent over digital transmission paths in the form of PCM codes. Pulse code modulation is a method of converting analog signals into digital form. It involves (1) periodic sampling of an input signal at a rate which preserves the signal bandwidth, (2) quantizing the sampled signal into discrete predetermined levels, and (3) coding the quantized signal into a fixed number of binary elements. Delta modulation is a form of PCM wherein the number of binary elements in each code is reduced to one. Each binary element represents the quantized difference between a signal sample and a reference level determined by the previously transmitted signal samples.

Delta modulator coders generally comprise a feedback loop circuit in which an analog signal is applied to a comparator wherein it is compared to a feedback signal representative of the transmitted sequence of delta modulation outputs. The comparator provides one output level if the analog signal is greater than the fed back signal, and an alternative output level if the analog signal is less than the fed back signal. The comparator output is sampled and the sampled pulses form the delta modulated code. The sampled pulses are also fed back to the comparator through a feedback path which includes an integrator so that the fed back signal derived from the integrated sampled pulses represents the analog signal already transmitted. In this way, the comparator and the sampling device provide output codes which correspond to the changes in the input analog signal. The integrator is generally an analog store that converts the delta modulated output pulses to an analog feedback signal.

A multielement PCM coder may be constructed from the cascaded combination of a delta modulator and a bidirectional counter. An input signal applied to the delta modulator results in a succession of delta-modulated pulses which are in turn applied to the counter. The counter, in response to the delta-modulated pulses, maintains a running count of the sequence of delta-modulated signals. Thus the state of the counter at any time represents the present value of the input analog signal and can provide a code corresponding to that value which consists of a fixed number of binary elements. A change in the input analog signal results in a different counter state so that successive samplings of the counter provide a PCM-coded signal.

The preceding combination, well known in the art, requires an integrator within the delta modulator feedback loop to store the delta modulated output for comparison purposes. This store generally comprises a capacitor network which stores only an approximate representation of the integrated delta modulated code.

BRIEF SUMMARY OF THE INVENTION

It is a general object of my invention to provide an improved PCM encoder employing a delta modulator.

It is another object of my invention to obviate the necessity to use a separate delta modulator store or integrator in such a coder.

A further object of my invention is to increase the accuracy of such a delta modulator coder by utilizing as the fed back signal to the comparator an accurate representation of the sequence of delta modulated codes rather than the approximate representation of prior delta modulator feedback loops.

My invention is a delta modulator arranged to convert an analog signal into a PCM code. The modulator comprises a bistable comparator, sampling gates, and a feedback path which includes a bidirectional counter. Clock pulses are applied to the sampling gates which operate to provide successive sampled pulses corresponding to changes in the input analog signal. The sampled output is gated to the bidirectional counter which stores a code corresponding to a sequence of the sampled signals. A decoder network connected between the counter and the comparator converts the stored code into an analog signal. This analog signal is fed back to the comparator. The sampled gate output provides a delta-modulated signal and a PCM code is obtained from the counter.

In an illustrative embodiment of my invention the counter is an up-down counter responsive to each sampled comparator output, and the decoder network comprises an arrangement of resistor elements and semiconductor switches which operate as a switchable attenuator network to convert the multielement code stored in the counter into an analog signal accurately representing the stored code.

Accordingly, it is a feature of my invention that the feedback signal for the comparator be provided by a counter which stores a multielement code corresponding to the sequence of delta-modulated pulses.

It is a further feature of my invention that the same counter that accurately stores the value of the sequence of delta-modulated codes for the conversion of the delta modulation to PCM be utilized to provide the feedback signal. Thus, in accordance with an aspect of my invention the uneconomical use of two separate storage devices in a PCM coder is obviated and a single-accurate digital store is provided to perform both functions.

It is another feature of one embodiment of my invention that the counter be an up-down counter and that an attenuator network be connected between the counter and the input to the comparator to decode the stored signal to an analog signal.

DETAILED DESCRIPTION

Figure 1:
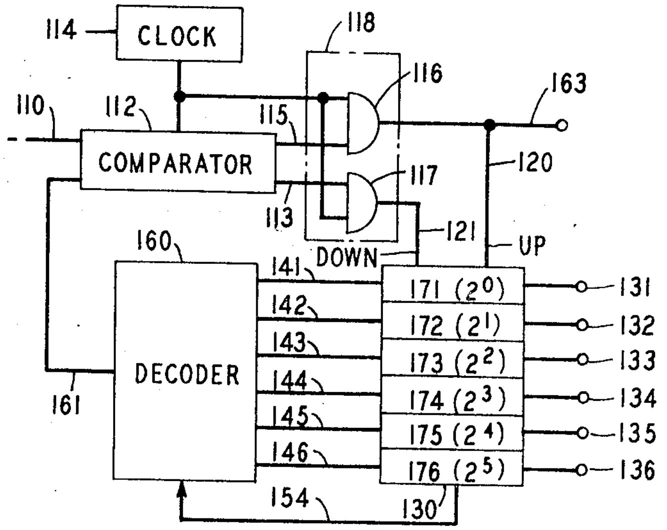
FIG. 1 depicts a block diagram of an illustrative embodiment of my invention.

FIG. 1 shows an illustrative embodiment of my invention in which an analog signal is applied to lead 110 so that a PCM code corresponding to the analog signal appears on outputs 131 through 136 and a delta modulated output signal appears on lead 163. The input analog signal is applied to comparator 112 which is operative to compare the signals on leads 110 and 161. Comparator 112 provides bistable outputs responsive to the difference between the signals on leads 110 and 161. If the signal on lead 110 is greater than the signal on lead 161, the comparator output on lead 115 is at a low potential while the output on lead 113 is at a high positive potential. If, on the other hand, the signal on lead 161 is greater than or equal to that on lead 110, the comparator state is reversed so that there is a high potential on lead 115 and a low potential on lead 113.

Clock 114 provides negative-going repetitive pulses to comparator 112 and to sampling gates 116 and 117. Gates 116 and 117 operate as NAND gates, well known in the art, so that only all low inputs produce a high output. The pulses applied to comparator 112 operate to maintain the state of the comparator for the duration of the clock pulse. In this way, the comparator output does not change during the clock pulses. Alternatively special counter arrangements, well known in the art, may be used to effectively delay the registration of a count so that changes in the comparator output during clock pulses do not affect circuit operation.

The outputs on leads 113 and 115 are applied to modulator 118 comprising gates 116 and 117. Modulator 118 is operative to modulate the timing pulses from clock 114 in accordance with the state of comparator 112. In particular, the pulses applied from the clock to gates 116 and 117 sample the comparator outputs on leads 113 and 115. An output pulse is obtained from only one of gates 116 and 117 during each applied clock pulse. In this manner, the output of gate 116 on lead 163 is a succession of single-element delta-modulated codes which occur as a result of the comparison of the input analog signal and the signal obtained from the feedback path including counter 130 and decoder 160. The feedback path signal on lead 161 corresponds to the already transmitted delta modulated code and comparator 112 is responsive only to changes in the input signal.

The outputs of gates 116 and 117 are also applied to counter 130 via leads 120 and 121. Counter 130 is a multistage, bidirectional or up-down counter. Any pulse on lead 120 from gate 116 causes the counter to count up, while any pulse on lead 121 from gate 117 causes it to count down. Since counter 130 consists of stages 171 through 176, it is capable of being switched to 64 different states determined by the sequence pulses from the sampling gates which pulses occur as a result of the operation of comparator 120. It is to be understood that other counter arrangements may be used. One set of outputs from the counter, on leads 131 through 136, indicates the state of the counter in binary form and may provide a linear or a nonlinear PCM code. The other set of outputs from counter 130 are applied to decoder 160 via leads 141 through 146. Outputs on leads 141–146 also indicate the state of the counter which state is decoded in decoder 160 so that the output on lead 161 is an analog signal representative of the value of the code stored in counter 130. In this way, the up-down counter operates both as a delta modulation to PCM code converter and as a digital store and integrator in the feedback loop of the delta modulator.

Decoder 160 converts the code stored in counter 130 into a single-analog signal which is applied to comparator 112 via lead 161. The output of the decoder is a function of the state of counter 130. The decoder provides a negative limiting voltage when all the stages of the counter are in their zero states. If only stage 176 is in the one state, the decoder output is at zero potential; and if all the stages of the counter are in their one state, the decoder output is at a limiting positive value.

Assume that the input on lead 110 is at zero potential and all stages of counter 130 are in the zero state. The output of decoder 161, under these circumstances, is the limiting negative value so that a positive difference is detected by comparator 112. The signal on lead 115 is low and a pulse is applied to the coder via lead 120 which sets stage 171 to the one state. The signal on lead 141 then shifts the output of the decoder in the positive direction. Since the zero input signal on lead 110 is still greater than the voltage on lead 161, a succession of pulses are applied to counter 130 via lead 120 until only stage 176 is in the one state and the decoder output voltage on lead 161 is zero. The feedback loop is then relatively stable so that the counter, on the average, remains with stage 176 in the one state. Positive going changes on lead 110 cause output sampling pulses to be applied to the counter via gate 116 and lead 120 to increase the value of the code stored therein. Negative-going changes on lead 110 cause pulses to be applied from gate 117 to the counter via lead 121 to decrement the stored code in the counter. In this way the counter substitutes for the integrator-type demodulator known in the art.

Figure 2:
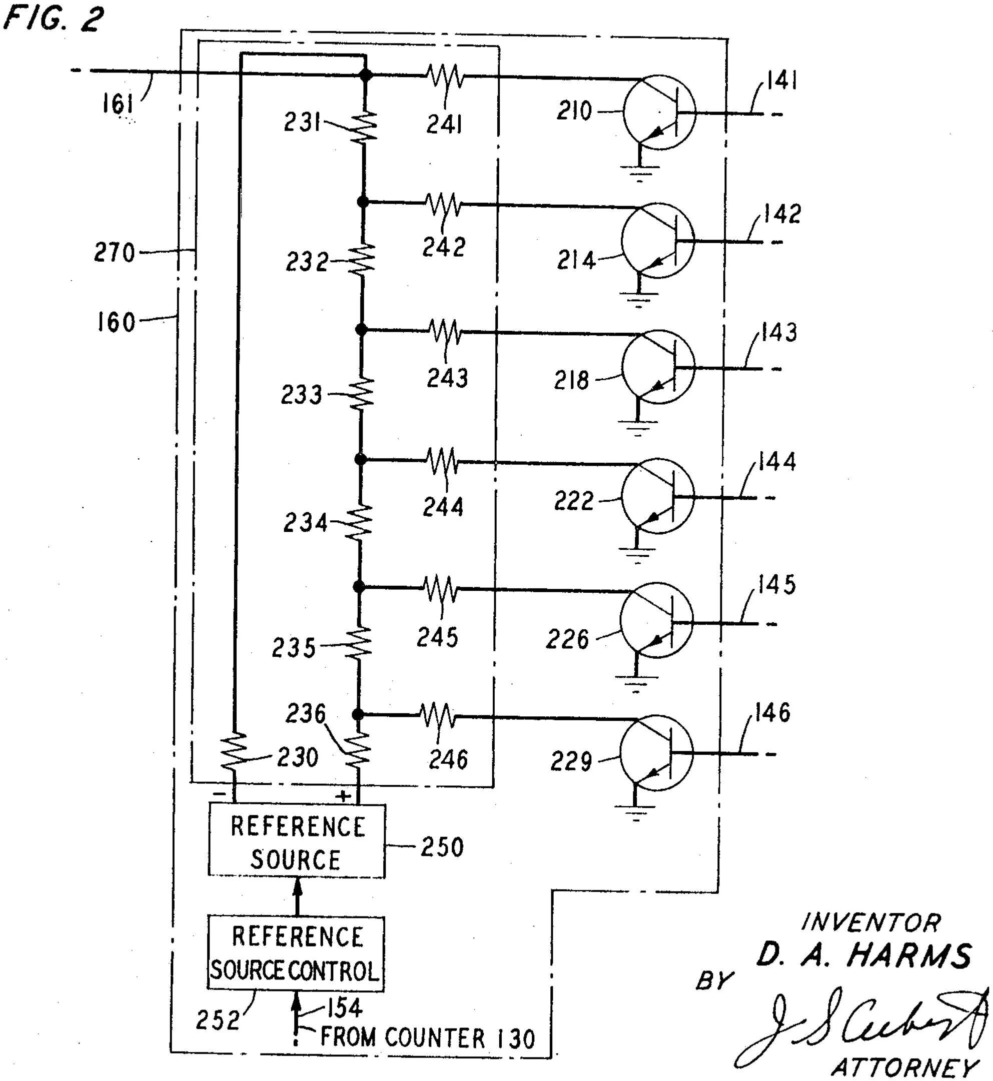
FIG. 2 shows a resistive decoder network which may be used in the embodiment of FIG. 1.

FIG. 2 shows one type of decoder which may be used in my invention. Leads 141 through 146 transmit the code stored in counter 130 to a group of transistors that operate as switches which control resistor attenuator network 270. A positive potential is applied to one terminal of resistor 236 from reference source 250 and a negative potential is applied therefrom to one terminal of resistor 230. The output of the decoder is obtained on lead 161. If all of counter stages 171 through 176 are reset, each of transistors 210, 214, 218, 222, 226 and 229 is in the off state because a ground potential signal is applied to its respective base. Under these conditions the output on lead 161 is at its most negative potential. When all of stages 171 through 176 are in the one state, each of transistors 210, 214, 218, 222, 226 and 229 is turned on which causes the voltage on lead 161 to be at its most positive potential. Attenuator network 270 is arranged so that if only transistor 229 is turned on, as a result of stage 176 being set, resistors 231 through 236 and 241 through 246 are selected so that a zero voltage potential is obtained on lead 161. The values of the resistors in attenuator network 270 may be arranged to provide a linear response to the code variations stored in counter 130 or to provide other desirable response curves well known in the art. If the response of network 270 is linear, a linear PCM code is obtained from counter 130. A nonlinear arrangement in network 270 results in a nonlinear PCM code from counter 130.

Reference source 250 may provide an adjustable voltage so that the range of operation of the delta modulator can be modified. The value of the voltages from source 250 may be automatically changed to obtain a maximum signal to quantizing noise ratio. In this way the quantizing step of the code may be altered. For example, when counter 130 is in its minimum or maximum state the reference voltage from source 250 may be switched to extend the range of operation of the coder. This is done through reference source control 252 which operates to selectively vary the voltages applied to resistors 230 and 236. Control 252, in turn, receives signals from counter 130 via lead 154 that indicate when the coder is at its minimum or maximum value. It is to be understood that control 252 may be made responsive to other conditions which would alter the range of the coder.

I claim:

1. A signal coder comprising means for receiving an input signal, comparing means responsive to said input signal applied to one terminal and an analog signal applied to a second terminal for producing a first difference signal responsive to a positive difference between said input signal and said analog signal and a second difference signal responsive to a negative difference between said input signal and said analog signal, means for generating repetitive timing pulses, means for modulating said repetitive timing pulses with said difference signals, counting means having first and second inputs and a plurality of outputs, said modulating means being connected between said comparing means and said first and second counting means inputs and being operative to gate said first and second difference signals respectively to said first and second counting means inputs, said counting means being operative in response to said first difference signal to count up and in response to said second difference signal to count down, and code converting means connected between said counting means and said second terminal comprising a voltage source, a resistive attenuator network connected to said voltage source, and a plurality of switches responsive to the state of said counting means for controlling the attenuation of said network, said voltage source further comprising means connected to said counting means responsive to the state of said counting means for selectively controlling said source voltage.

2. A signal coder according to claim 1 wherein said voltage source includes a pair of output terminals, said resistive attenuator network comprises first and second resistors each having first and second terminals and plurality of resistors serially connected between the second terminal of said first resistor and the first terminal of said second resistor, one of said voltage source output terminals being connected to the first terminal of said first resistor, the other of said voltage source output terminals being connected to the second terminal of said second resistor, and the first terminal of said second resistor being connected to said comparing means second terminal.

3. A signal coder according to claim 1, further comprising a plurality of output terminals and means for connecting each of said counting means outputs to one of said plurality of output terminals whereby a pulse code modulated code is applied to said plurality of output terminals.

4. A signal coder according to claim 3, wherein said voltage source includes a pair of output terminals, said resistive attenuator network comprises first and second resistors each having first and second terminals and plurality of resistors serially connected between the second terminals of said first resistor and the first terminal of said second resistor, one of said voltage source output terminals being connected to the first terminal of said first resistor, the other of said voltage source output terminals being connected to the second terminal of said second resistor, and the first terminal of said second resistor being connected to said comparing means second terminal.

* * * * *